(12) United States Patent
Broquet et al.

(10) Patent No.: US 9,846,243 B2
(45) Date of Patent: Dec. 19, 2017

(54) METHOD FOR CALIBRATING SPATIAL ERRORS, AND METHOD AND SYSTEM FOR ESTIMATING THE ATTITUDE OF A VEHICLE

(71) Applicants: AIRBUS DEFENCE AND SPACE SAS, Les Mureaux (FR); CENTRE NATIONAL D'ETUDES SPATIALES CNES, Paris (FR)

(72) Inventors: Renaud Broquet, Toulouse (FR); Bernard Polle, Saint Orens de Gameville (FR); Johan Montel, Maurens Scopont (FR)

(73) Assignees: AIRBUS DEFENCE AND SPACE SAS, Toulouse (FR); CENTRE NATIONAL D'ETUDES SPATIALES CNES, Paris (FR)

( * ) Notice: Subject to any disclaimer, the term of this patent is extended or adjusted under 35 U.S.C. 154(b) by 575 days.

(21) Appl. No.: 14/388,806

(22) PCT Filed: Mar. 28, 2013

(86) PCT No.: PCT/EP2013/056684
§ 371 (c)(1),
(2) Date: Sep. 27, 2014

(87) PCT Pub. No.: WO2013/144282
PCT Pub. Date: Oct. 3, 2013

(65) Prior Publication Data
US 2015/0015436 A1     Jan. 15, 2015

(30) Foreign Application Priority Data
Mar. 29, 2012 (FR) .................................... 12 00948
Jun. 15, 2012 (FR) .................................... 12 01717

(51) Int. Cl.
*G01S 19/55*     (2010.01)
*G01S 3/46*     (2006.01)
(Continued)

(52) U.S. Cl.
CPC ................ *G01S 19/55* (2013.01); *G01S 3/46* (2013.01); *G01S 3/48* (2013.01); *G01S 19/54* (2013.01);
(Continued)

(58) Field of Classification Search
CPC .......... G01S 19/54; G01S 19/55; G01S 19/22; G01S 19/53; G01S 5/0247; G01S 5/06; G01S 5/00; G01S 3/46; G01S 3/48
(Continued)

(56) References Cited

U.S. PATENT DOCUMENTS 5,583,513 A  * 12/1996  Cohen ..................... G01S 19/04
                                                       342/353
5,959,576 A  *  9/1999  Ring ....................... B64G 1/24
                                                       244/171
(Continued)

FOREIGN PATENT DOCUMENTS

EP      2085787 A1   8/2009
WO      00/22452 A1  4/2000

OTHER PUBLICATIONS

Gabor et al., "Satellite-Satellite Single-Difference Phase Bias Calibration as Applied to Ambiguity Resolution", Navigation, Dec. 1, 2002, pp. 223-243, vol. 49, No. 4, Institute of Navigation, Fairfax, VA, US.

*Primary Examiner* — Chuong P Nguyen
(74) *Attorney, Agent, or Firm* — Im IP Law; C. Andrew Im (57) ABSTRACT

A method for calibrating spatial errors induced by phase biases having a detrimental effect on the measurements of
(Continued)

phase differences of radio signals received by three unaligned receiving antennas of a vehicle. An inter-satellite angular deviation of a pair of satellites is estimated in two different ways: on the basis of the respective positions of the vehicle and of the satellites to obtain a theoretical inter-satellite angular deviation; and on the basis of the respective directions of incidence of the satellites relative to the vehicle, which are determined from phase measurements, to obtain an estimated inter-satellite angular deviation. The space errors are estimated on the basis of said theoretical and estimated inter-satellite angular deviations. Also, a method and system for estimating the attitude of a vehicle, in particular a spacecraft.

14 Claims, 3 Drawing Sheets

(51) Int. Cl.
| | | |
|---|---|---|
| | *G01S 19/54* | (2010.01) |
| | *G01S 3/48* | (2006.01) |
| | *G01S 19/53* | (2010.01) |
| | *G01S 5/06* | (2006.01) |
| | *G01S 5/02* | (2010.01) |
| | *G01S 19/22* | (2010.01) |

(52) U.S. Cl.
CPC .............. *G01S 5/0247* (2013.01); *G01S 5/06* (2013.01); *G01S 19/22* (2013.01); *G01S 19/53* (2013.01)

(58) Field of Classification Search
USPC ............. 342/357.38, 357.61, 357.37, 357.36
See application file for complete search history.

(56) References Cited

U.S. PATENT DOCUMENTS

| | | | | |
|---|---|---|---|---|
| 6,052,647 | A * | 4/2000 | Parkinson | G01S 19/11 |
| | | | | 342/357.36 |
| 6,285,927 | B1 * | 9/2001 | Li | B64G 1/24 |
| | | | | 244/164 |
| 6,288,671 | B1 * | 9/2001 | Wu | G01S 3/30 |
| | | | | 244/164 |
| 6,463,366 | B2 * | 10/2002 | Kinashi | G01C 21/24 |
| | | | | 342/357.36 |
| 7,292,185 | B2 * | 11/2007 | Whitehead | G01S 19/53 |
| | | | | 342/357.36 |
| 8,548,649 | B2 * | 10/2013 | Guyette | A01B 79/005 |
| | | | | 111/170 |
| 9,164,174 | B2 * | 10/2015 | Chen | G01S 19/04 |
| 2009/0150074 | A1 * | 6/2009 | Vanderwerf | G01S 19/20 |
| | | | | 701/469 |

* cited by examiner

METHOD FOR CALIBRATING SPATIAL ERRORS, AND METHOD AND SYSTEM FOR ESTIMATING THE ATTITUDE OF A VEHICLE

RELATED APPLICATIONS

This application is a §371 application from PCT/EP2013/056684 filed Mar. 28, 2013, which claims priority from French Patent Application No. 12 00948 filed Mar. 29, 2012 and French Patent Application No. 12 01717 filed Jun. 15, 2012, each of which is herein incorporated by reference in its entirety.

TECHNICAL FIELD

The present invention relates to the estimation of attitude of an aerial craft or spacecraft as a function of phase measurements of radioelectric signals received by this craft. More particularly, the present invention relates to the calibration of errors, referred to as "spatial errors", induced by phase biases affecting the phase measurements, said phase biases depending on a direction of incidence of the radioelectric signals with respect to the craft.

PRIOR ART

To estimate the attitude of a spacecraft of satellite type, it is indeed known to measure the phases of radioelectric signals received from a transmitter by two reception bases of the craft, a reception base consisting of two reception antennas, and the reception antennas of said two reception bases not all being aligned.

Indeed, it is possible to determine a path difference of the radioelectric signals received from the transmitter by the two reception antennas of a reception base by comparing the phases measured on said two reception antennas. The direction of incidence of the transmitter with respect to the craft, that is to say the direction of the transmitter in a frame fixed with respect to the craft, can thereafter be determined as a function of two path differences determined for the two reception bases.

By estimating the directions of incidence of two transmitters, it is possible to estimate the attitude of the craft relative to these transmitters. The absolute attitude of the craft can furthermore be estimated if the respective absolute positions of the craft and of the transmitters are known. Generally, the precision of the estimation of the attitude of the craft is improved by considering a number of transmitters greater than two.

By considering transmitters such as satellites of a global satellite navigation system (GPS, Galileo, etc.), the estimation of the attitude of the craft will be greatly facilitated. Indeed, GPS satellites, for example, transmit navigation information which makes it possible to determine the position of the craft with the help of navigation information received by GPS receivers mounted aboard said craft.

However, the estimation of attitude as a function of phase measurements generally relies on the assumption that the radioelectric signals received have followed a direct single path from the transmitter to the phase center of each of the reception antennas. Now, other, indirect, paths often exist between the transmitter and each of the reception antennas. These indirect paths are related to the presence of reflecting and/or diffracting elements in proximity to the reception antennas of the craft. Thus, a radioelectric signal received from the transmitter by a reception antenna will be the sum of a component received via the direct path, the so-called "direct component", and of a component received via indirect paths, the so-called "indirect component".

The indirect component measured for a reception antenna can generally be regarded as a phase bias whose value depends essentially on the direction of incidence of the radioelectric signal received via the direct path, and optionally on the position and on the orientation of the reflecting and/or diffracting elements when the latter are mobile.

However, for one and the same direction of incidence, the phase biases due to multi-paths vary from one reception antenna to another, so that these phase biases do not compensate one another in the calculation of the phase differences between pairs of reception antennas and introduce errors in the phase differences used for the estimation of the attitude of the craft. These errors in the phase differences are referred to as "spatial errors" since the phase biases from which they originate depend on the direction of incidence considered.

To calibrate the spatial errors, it is possible to compare the attitude, estimated as a function of the phase differences of radioelectric signals received by the three reception antennas, with another estimation of the attitude provided by an attitude tracker, distinct from the three reception antennas, such as a star tracker. It is understood, however, that such a solution requires that two distinct systems be carried onboard the craft in order to estimate the attitude of the craft.

DISCLOSURE OF THE INVENTION

The objective of the present invention is to remedy all or part of the limitations of the prior art solutions, especially those set forth hereinabove, by proposing a solution which makes it possible to calibrate the spatial errors, induced by the reception on the reception antennas of the craft of indirect components, which does not require the use of an attitude tracker distinct from said reception antennas.

For this purpose, and according to a first aspect, the invention relates to a method for calibrating spatial errors induced by phase biases affecting measurements of phase differences of radioelectric signals received by at least three non-aligned reception antennas of a craft, said phase biases depending on a direction of incidence of the radioelectric signals with respect to the craft. The calibration method comprises, for a pair of satellites situated at a given instant in a radioelectric field of view of the craft, steps of:
  obtaining of respective positions of the craft and of the satellites of said pair,
  estimation of an inter-satellite angular distance of said pair of satellites as a function of the respective positions of the craft and of the satellites of said pair, so as to obtain a so-called "theoretical" inter-satellite angular distance,
  estimation of respective directions of incidence of the satellites of said pair with respect to the craft as a function of phase measurements of radioelectric signals received from the satellites of said pair by the three reception antennas of the craft,
  estimation of the inter-satellite angular distance of said pair of satellites as a function of the respective directions of incidence of the satellites of said pair with respect to the craft, so as to obtain a so-called "estimated" inter-satellite angular distance,
  estimation of the spatial errors for the respective directions of incidence of the satellites of said pair with respect to the craft as a function of the theoretical inter-satellite angular distance and of the estimated inter-satellite angular distance which are determined for said pair of satellites.

In practice, the spatial errors will be estimated as a function of theoretical inter-satellite angular distances and of estimated inter-satellite angular distances determined for several pairs of satellites, said pairs of satellites being able for example to be considered simultaneously and/or successively.

The expression "inter-satellite angular distance" of a pair of satellites is understood to mean the angle between the respective directions of the two satellites of this pair with respect to the craft. The benefit of estimating inter-satellite angular distances resides in the fact that the latter are independent of the attitude of the craft, but depend solely on the respective positions of the satellites and of the craft.

The calibration of the spatial errors is therefore carried out by estimating the inter-satellite angular distances of pairs of satellites in two different ways:
 as a function of the respective positions of the satellites and of the craft, so as to obtain theoretical inter-satellite angular distances,
 as a function of the respective directions of incidence of the satellites, estimated as a function of phase measurements affected by the phase biases to be calibrated, so as to obtain estimated inter-satellite angular distances.

By considering the theoretical inter-satellite angular distances as devoid of errors, and by comparing the estimated inter-satellite angular distances, affected by the phase biases, with said theoretical inter-satellite angular distances, it will be possible to calibrate the spatial errors within the limit of the precision of the respective positions of the satellites and of the craft.

It should however be noted that, because the inter-satellite angular distances considered do not depend on the attitude of the craft, the spatial errors will in certain cases be able to be calibrated only to within an attitude bias. Stated otherwise, the attitude of the craft, optionally estimated after calibration and correction of the spatial errors, may be affected by a bias. However, this attitude bias will be the same whatever the real attitude of the craft and may, if appropriate, be readily detected and in its turn calibrated by implementing means considered to be known to the person skilled in the art.

In particular modes of implementation, the calibration method comprises one or more of the following characteristics, taken in isolation or in accordance with all technically possible combinations.

In a particular mode of implementation, the spatial errors are estimated in the form of a parametric model whose parameters are estimated as a function of theoretical inter-satellite angular distances and of estimated inter-satellite angular distances calculated for several pairs of satellites.

Such provisions make it possible to reduce the number of different directions of incidence for which spatial errors must be calibrated, and therefore to reduce the number of calculations to be performed as well as the quantity of spatial errors/parameters to be stored.

In a particular mode of implementation, the radioelectric field of view of the craft is previously partitioned into a plurality of distinct cones of incidence of radioelectric signals with respect to the craft, and the spatial errors are considered in the parametric model to be the same for any direction of incidence inside one and the same incidence cone. The estimated parameters of the parametric model are then, for each incidence cone, the value of the spatial errors for any direction of incidence inside this incidence cone.

In a particular mode of implementation, the cones of incidence of low elevation with respect to a plane determined by the phase centers of the three reception antennas of the craft are of smaller respective solid angles than those of cones of incidence of high elevation with respect to said plane.

It has indeed been noted that the indirect component is weaker for substantially normal directions of incidence (high elevation), with respect to the plane determined by the three reception antennas, than for the grazing directions of incidence (low elevation) with respect to said plane.

Such provisions therefore make it possible to optimize the calibration of the spatial errors by estimating more spatial errors for the directions of incidence for which the spatial errors vary a lot than for the directions of incidence for which the spatial errors vary little.

In a particular mode of implementation, the spatial errors are estimated in the form of a parametric model whose basis functions are spherical harmonics.

In a particular mode of implementation, the satellites belong to a global satellite navigation system and the three reception antennas are antennas of receivers of said global satellite navigation system. Furthermore, the respective positions of the satellites and of the craft are determined with the help of navigation information included in the radioelectric signals received from the satellites.

Such provisions are advantageous in that the calibration of the spatial errors can be carried out exclusively with the help of the radioelectric signals received from the satellites:
 the theoretical inter-satellite angular distances are determined with the help of the navigation information included in the radioelectric signals received from the satellites,
 the estimated inter-satellite angular distances are determined with the help of the phase measurements of said radioelectric signals received from the satellites.

The calibration of the spatial errors can thus be carried out without using any attitude tracker other than the three reception antennas.

It should be noted that, in this particular mode of implementation, the inter-satellite angular distances can be considered to be devoid of errors. Indeed, the positions of such satellites are customarily estimated to within a few meters. Moreover, the position of the craft can be estimated to within a few meters by the receivers of the global satellite navigation system. On account of the remote distance between the satellites and the craft which, in the case of a craft in low orbit, is much greater than 1000 kilometers, it follows that the estimation of the theoretical inter-satellite angular distances with the help of the positions of the satellites and of the craft is extremely precise and can be considered to first order as devoid of errors.

In a particular mode of implementation, the spatial errors are estimated in a recursive manner, pair of satellites by pair of satellites or group of pairs of satellites by group of pairs of satellites.

In a particular mode of implementation, when Ns satellites organized into Np pairs are situated simultaneously in the radioelectric field of view of the craft, the spatial errors for each of the respective directions of incidence of said Ns satellites with respect to the craft are estimated simultaneously as a function of the theoretical inter-satellite angular distances and of the estimated inter-satellite angular distances determined for said Np pairs of satellites.

In a particular mode of implementation, new pairs of satellites are considered in the course of time as satellites enter the radioelectric field of view of the craft.

In a particular mode of implementation, one and the same pair of satellites is considered several times in the course of time.

According to a second aspect, the invention relates to a method of estimating attitude of a craft as a function of measurements of phase differences of radioelectric signals received by at least three non-aligned reception antennas of the craft. Said attitude estimation method also comprises the calibration of spatial errors in accordance with the invention.

According to a third aspect, the invention relates to a computer program product comprising a set of program code instructions which, when they are executed by one or more processors, implement a method for calibrating spatial errors or an attitude estimation method in accordance with the invention.

According to a fourth aspect, the invention relates to a system for estimating attitude of a craft as a function of measurements of phase differences of radioelectric signals received by at least three non-aligned reception antennas of the craft. Said attitude estimation system furthermore comprises means configured to calibrate the spatial errors in accordance with the invention.

In a particular embodiment of the attitude estimation system, the three reception antennas are antennas of receivers of a global satellite navigation system, for example GPS receivers or Galileo receivers.

According to a fifth aspect, the invention relates to a spacecraft comprising an attitude estimation system in accordance with the invention.

In a particular embodiment, the spacecraft comprises a body comprising several substantially plane external faces, and the three reception antennas are arranged on one and the same external face of said body.

PRESENTATION OF THE FIGURES

The invention will be better understood on reading the following description, given by way of wholly nonlimiting example while referring to the figures which represent.

In these figures, references that are identical from one figure to another designate identical or analogous elements. For the sake of clarity, the elements represented are not to scale, unless stated otherwise.

DETAILED DESCRIPTION OF EMBODIMENTS

Figure 1:
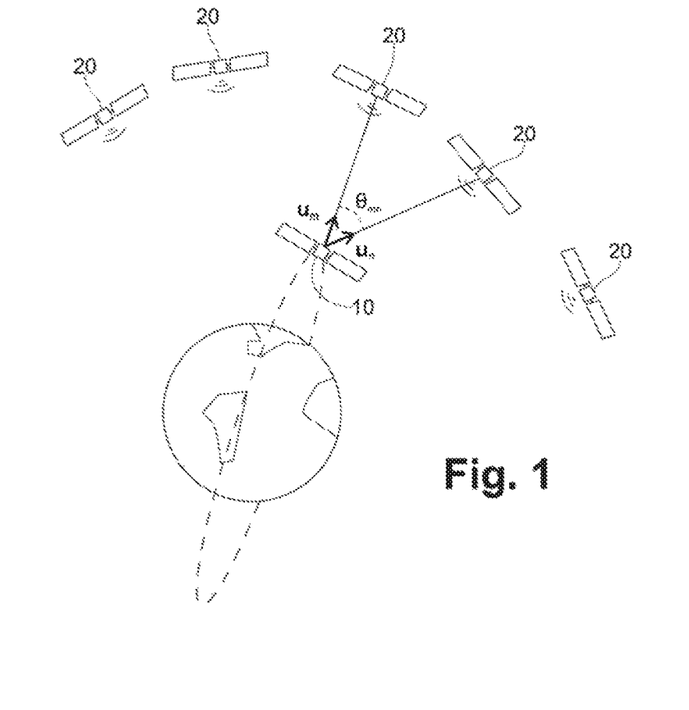
FIG. 1: a schematic representation of a spacecraft and of satellites in orbit around the Earth.

FIG. 1 schematically represents a spacecraft 10, whose attitude it is sought to estimate, and satellites 20 in orbit around the Earth.

For example, the spacecraft 10 is in low orbit (LEO for "Low Earth Orbit") around the Earth.

The subsequent description deals in a nonlimiting manner with the case where the satellites 20 are satellites of a global satellite navigation system (GNSS for "Global Navigation Satellite System"), such as a GPS and/or Galileo system, etc.

More particularly, GPS satellites 20 are considered in a nonlimiting manner. Such GPS satellites 20 are in circular orbit around the Earth, at an approximate altitude of 20000 kilometers.

FIG. 1 also represents the respective directions of two GPS satellites 20 with respect to the spacecraft 10, which are represented by vectors $u_m$ and $u_n$ respectively. The angle $\theta_{mn}$ between said directions $u_m$ and $u_n$ corresponds to the inter-satellite angular distance of the pair formed by said two GPS satellites 20.

Figure 2:
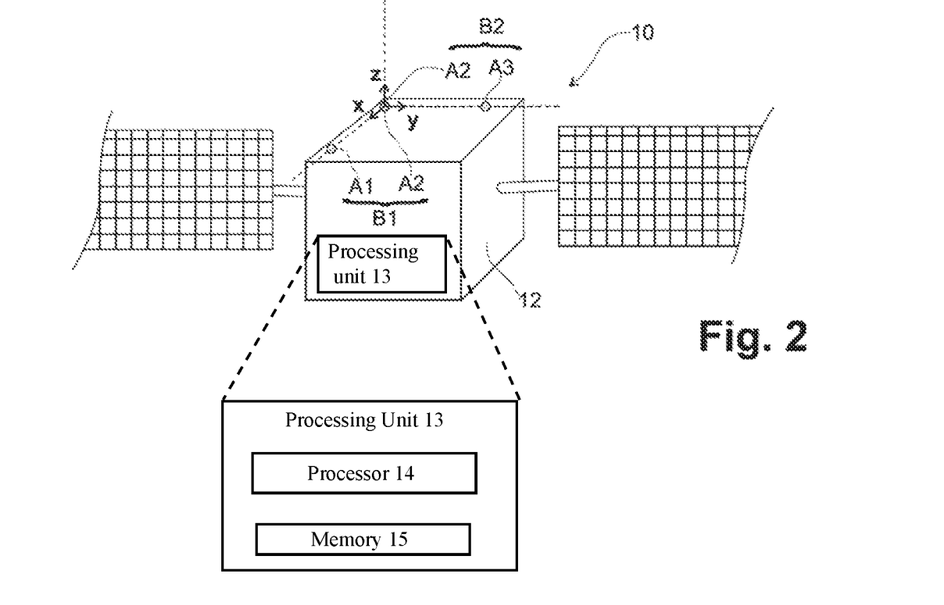
FIG. 2: a schematic representation of a close-up view of the spacecraft of FIG. 1, FIG. 3: a chart illustrating the main steps of an exemplary implementation of a method for calibrating spatial errors.

FIG. 2 schematically represents a close-up view of the spacecraft 10. As illustrated by this figure, the spacecraft 10 comprises a body 12 comprising several substantially plane external faces. For example, the body 12 is substantially cube shaped.

The spacecraft 10 also comprises three non-aligned reception antennas, respectively A1, A2 and A3, suitable for receiving radioelectric signals transmitted by the GPS satellites 20. Nothing excludes, according to other examples, consideration of a more sizable number of reception antennas A1, A2, A3 to estimate the attitude of said spacecraft 10. However, to be able to estimate the attitude of said spacecraft 10 according to three axes, it is necessary to have at least three non-aligned reception antennas.

The three reception antennas A1, A2, A3 belong to GPS receivers. These GPS receivers can be completely distinct or share certain means, such as for example calculation means suitable for determining the position of the craft 10 as a function of the radioelectric signals received on any one of said three reception antennas A1, A2, A3.

Preferably, and as illustrated by FIG. 2, the three reception antennas A1, A2, A3 are arranged on one and the same external face of said body. In this way, it is possible to maximize a radioelectric field of view common to said three reception antennas. This makes it possible to maximize the number of GPS satellites 20 that are situated simultaneously in the radioelectric fields of view of said three reception antennas. Hereinafter, "radioelectric field of view of the spacecraft" designates the radioelectric field of view common to the three reception antennas A1, A2, A3.

The three reception antennas A1, A2, A3 are organized into two reception bases: a first reception base B1 formed by the reception antennas A1 and A2, and a second reception base B2 formed by the reception antennas A2 and A3. It should be noted that nothing excludes, according to other examples, consideration also of a third reception base formed by the reception antennas A1 and A3.

In a wholly nonlimiting manner, the case is considered where the two reception bases B1, B2 are substantially orthogonal.

Throughout the context of the present patent application, "direction of incidence" of a GPS satellite 20 designates the expression of the direction of this GPS satellite with respect to the spacecraft 10 in a frame fixed with respect to said spacecraft. The directions $u_m$ and $u_n$ may indeed be expressed in an arbitrary frame; when they are expressed in a frame fixed with respect to the spacecraft 10, they are designated by $v_m$ and $v_n$ respectively. It is understood that, alone, the directions of incidence $v_m$ and $v_n$ of the GPS satellites 20 with respect to the spacecraft 10 encompass information on the orientation of the spacecraft 10 with respect to the GPS satellites 20, which information makes it possible, when combined with the respective absolute positions of the craft 10 and of the GPS satellites 20, to estimate the attitude of the craft.

FIG. 2 illustrates an exemplary frame fixed with respect to the spacecraft 10, referred to as the "craft frame", in which the directions of incidence of the various GPS satellites 20 will be expressed in the subsequent description. As illustrated by FIG. 2, the craft frame is substantially centered on the reception antenna A2, and is defined by three mutually orthogonal unit vectors x, y and z. The vector x is substantially collinear with the phase centers of the reception antennas A1, A2 of the reception base B1, and the vector y is substantially collinear with the phase centers of the reception antennas A2, A3 of the reception base B2.

As indicated previously, the presence of reflecting and/or diffracting elements in proximity to the three reception antennas A1, A2, A3 implies that the radioelectric signals received on each of said three reception antennas will exhibit more or less sizable indirect components. Said indirect components are the origin of phase biases which depend on a direction of incidence of the radioelectric signals with respect to the spacecraft 10, and said phase biases introduce spatial errors into the estimation of the attitude of said spacecraft 10.

Figure 3:
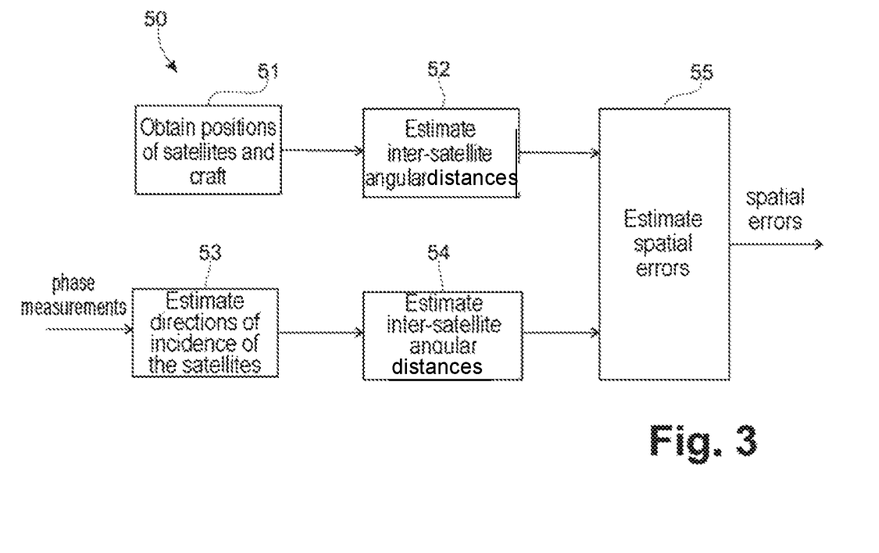

FIG. 3 represents the main steps of an exemplary implementation of a method 50 for calibrating spatial errors, which are:
51 obtaining of respective positions of the spacecraft 10 and of Ns GPS satellites 20 situated at a given instant in the radioelectric field of view of the spacecraft, the Ns GPS satellites being organized into Np pairs,
52 estimation of respective inter-satellite angular distances of the Np pairs of GPS satellites 20 as a function of the respective positions of the craft 10 and of the Ns GPS satellites, so as to obtain so-called "theoretical" inter-satellite angular distances,
53 estimation of respective directions of incidence of the Ns GPS satellites 20 with respect to the spacecraft 10 as a function of phase measurements of radioelectric signals received from said GPS satellites by the three reception antennas A1, A2, A3 of the spacecraft 10,
54 estimation of the respective inter-satellite angular distances of the Np pairs of GPS satellites 20 as a function of the respective directions of incidence of the Ns GPS satellites with respect to the spacecraft 10, so as to obtain so-called "estimated" inter-satellite angular distances,
55 estimation of the spatial errors for each of the respective directions of incidence of the Ns GPS satellites 20 with respect to the spacecraft 10 as a function of said theoretical inter-satellite angular distances and said estimated inter-satellite angular distances calculated for said Np pairs of GPS satellites 20.

Thus, the calibration of the spatial errors relies on the estimation of the respective inter-satellite angular distances of the Np pairs of GPS satellites 20 in two different ways so as to obtain:
theoretical inter-satellite angular distances independent of the spatial errors,
estimated inter-satellite angular distances affected by said spatial errors.

Obtaining of the Positions of the GPS Satellites and of the Spacecraft

In a known manner, the GPS satellites 20 incorporate navigation information in the radioelectric signals that they transmit.

Said navigation information comprises especially, for each radioelectric signal transmitted by a GPS satellite 20, the position of this GPS satellite 20 as well as the time of transmission of said radioelectric signal.

Thus, the spacecraft 10, equipped with a GPS receiver, directly obtains the respective positions of the Ns GPS satellites 20 in said navigation information, and can determine in a conventional manner its position with the help of said navigation information.

Determination of the Theoretical Inter-Satellite Angular Distances

In the subsequent description, it is assumed, in order to simplify the equations, that the respective positions of the Ns GPS satellites 20 and of the spacecraft 10, as a function of which the theoretical inter-satellite angular distances are determined, are obtained without errors.

In practice, it has been verified that the precision of said positions makes it possible in theory to have an error in the estimation of the inter-satellite angular distances of the order of 10e-04 degrees, this being negligible with respect to the precision aimed at in estimating the attitude of the spacecraft 10, which is of the order of 0.1 degrees.

As illustrated by FIG. 2, the inter-satellite angular distance between two satellites of directions respectively $u_m$ and $u_n$ corresponds to an angle $\theta_{mn}$ between said directions $u_m$ and $u_n$.

For example, the directions $u_m$ and $u_n$ are estimated as a function of the positions of the GPS satellites 20 considered and of the spacecraft 10. In the subsequent description, in a nonlimiting manner, the case is considered where the inter-satellite angular distance $\theta_{mn}$ is estimated in the form of the scalar product $u_m \cdot u_n$, thus amounting in practice to estimating $\cos(\theta_{mn})$ when the directions $u_m$ and $u_n$ are unit vectors.

The respective positions of the spacecraft 10 and of the GPS satellites 20 are for example obtained in a fixed frame centered on the Earth. In this fixed frame centered on the Earth, we designate by:
($x_R$, $y_R$, $z_R$) the coordinates of the spacecraft 10,
($x_m$, $y_m$, $z_m$) the coordinates of the GPS satellite 20 of direction $u_m$,
($x_n$, $y_n$, $z_n$) the coordinates of the GPS satellite 20 of direction $u_n$.

In this case, the directions $u_m$ and $u_n$ are for example determined according to the following expressions:

$$u_m = \frac{1}{P_m} \cdot (x_m - x_R, y_m - y_R, z_m - z_R)$$

$$u_n = \frac{1}{P_n} \cdot (x_n - x_R, y_n - y_R, z_n - z_R)$$

in which expressions $P_m$ and $P_n$ are normalization coefficients.

Next the theoretical inter-satellite angular distance between the GPS satellites 20 of directions $u_m$ and $u_n$ is determined in the form of the scalar product $u_m \cdot u_n$ which is equal to:

$$u_m \cdot u_n = \frac{(x_m - x_R) \cdot (x_n - x_R) + (y_m - y_R) \cdot (y_n - y_R) + (z_m - z_R) \cdot (z_n - z_R)}{P_m \cdot P_n}$$

Estimation of the Directions of Incidence as a Function of Phase Measurements

As indicated previously, "estimating the direction of incidence" of a GPS satellite 20 is intended to mean the act of estimating the direction of this GPS satellite with respect to the spacecraft 10 in a frame fixed with respect to said spacecraft, such as the craft frame.

Figure 4:
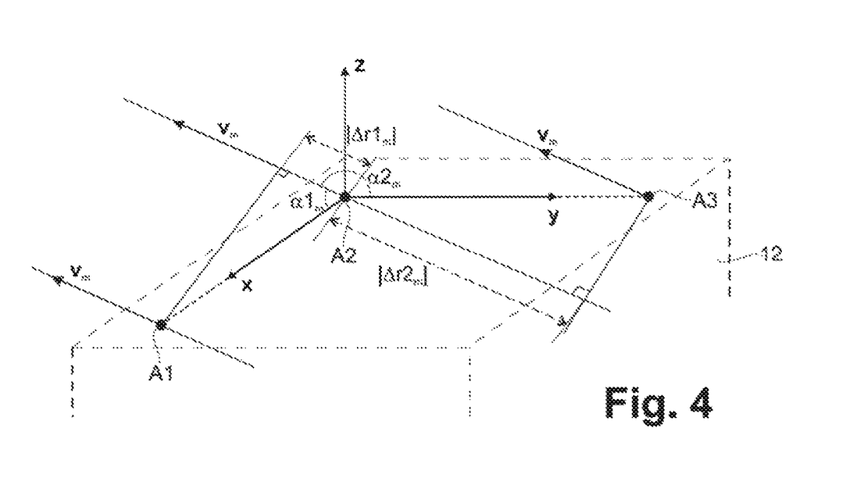
FIG. 4: a schematic representation of a close-up view of the spacecraft illustrating the expression of a direction of a satellite with respect to said spacecraft, in a frame fixed with respect to said spacecraft.

FIG. 4 represents in a more detailed manner the direction of incidence $v_m$ in the craft frame, so as to explain how said direction of incidence $v_m$ may be estimated.

As illustrated by FIG. 4, the direction of incidence $v_m$ makes an angle $\alpha1_m$ with the vector x of the craft frame, and an angle $\alpha2_m$ with the vector y of said craft frame.

Furthermore, in a wholly nonlimiting manner, the case is considered where the two reception bases B1, B2 are of the same length b (not illustrated by the figures).

Consequently, we have $\cos(\alpha1_m)=\Delta r1_m/b$ and $\cos(\alpha2_m)=\Delta r2_m/b$, in which expressions:

$\Delta r1_m$ is the path difference of the radioelectric signals received in the direction of incidence $v_m$ by the reception antennas A1, A2 of the reception base B1, $\Delta r2_m$ is the path difference of the radioelectric signals received in the direction of incidence $v_m$ by the reception antennas A2, A3 of the reception base B2.

It should be noted that, in these expressions, $\Delta r1_m$ (respectively $\Delta r2_m$) is negative when $\alpha1_m$ (respectively $\alpha2_m$) is greater than $\pi/2$.

The direction of incidence $v_m$ is expressed for example:

$$v_m = \left(\frac{\Delta r1_m}{b}, \frac{\Delta r2_m}{b}, \sqrt{1-\left(\frac{\Delta r1_m}{b}\right)^2-\left(\frac{\Delta r2_m}{b}\right)^2}\right)$$

In this expression, the length b is known.

Furthermore, and in a manner known to the person skilled in the art, it is possible to determine a path difference of the radioelectric signals received by the two reception antennas of a reception base B1, B2 as a function of the difference of the phases measured on said two reception antennas.

It should be noted that an ambiguity may occur due to the fact that, the phase being measured modulo $2\pi$, the path difference is estimated modulo the wavelength of the radioelectric signals received. However, methods exist, considered to be known to the person skilled in the art, for removing the ambiguity in the path difference (see for example FR 2926891).

Consequently, an estimation $ve_m$ of the direction of incidence $v_m$ can be obtained by estimating the path differences $\Delta r1_m$ and $\Delta r2_m$ by methods considered to be known to the person skilled in the art.

Determination of the estimated inter-satellite angular distances

The estimated inter-satellite angular distances are determined as a function of the estimations $ve_k$ ($1 \leq k \leq N_s$) of the directions of incidence $v_k$ of the Ns GPS satellites 20 with respect to the spacecraft 10.

For example, estimations $ve_m$ and $ve_n$ of the directions of incidence respectively $v_m$ and $v_n$ are determined, for example such as described previously, and the corresponding estimated inter-satellite angular distance is determined in the form of the scalar product $ve_m \cdot ve_n$.

Estimation of the Spatial Errors

In the subsequent description, the case is considered where the spatial errors are estimated, for each reception base B1, B2, in the form of an error in a path difference of the radioelectric signals.

Indeed, although the phase biases vary from one reception antenna to another, it is in fact the phase difference between two reception antennas which is used to estimate the path difference, itself used to estimate the attitude of the spacecraft 10. Thus, the spatial errors induced by said phase biases can actually be estimated, for each reception base B1, B2, in the form of an error in a path difference or in a phase difference between the radioelectric signals received by the two reception antennas of the reception base considered.

An exemplary linear relation that may be used to estimate the spatial errors as a function of the theoretical inter-satellite angular distances and of the estimated inter-satellite angular distances is established hereinafter.

More particularly, a pair of GPS satellites 20 of respective directions $u_m$ and $u_n$ (directions of incidence $v_m$ and $v_n$ in the craft frame) is considered in this example, and a linear relation is established between the following parameters:

a difference $\Delta Y_{mn}$ between the theoretical inter-satellite angular distance and the estimated inter-satellite angular distance, determined for said pair of satellites, stated otherwise:

$$\Delta Y_{mn} = ve_m \cdot ve_n \cdot u_m \cdot u_n = ve_m \cdot ve_n - V_m \cdot v_n$$

a vector $\delta_{mn}$ comprising the spatial errors for each reception base B1, B2 and each direction of incidence $v_m$ and $v_n$.

More particularly, this example considers the case where the vector $\delta_{mn}$ is expressed in the following form:

$$\delta_{mn} = (\delta r_m^{B2} \delta r_m^{B1} \delta r_n^{B2} \delta r_n^{B1})^T$$

in which expression:

$\delta r^{B2}_m$ is the error in the path difference for the reception base B2 in the direction of incidence $v_m$, $\delta r^{B1}_m$ is the error in the path difference for the reception base B1 in the direction of incidence $v_m$, $\delta r^{B2}_n$ is the error in the path difference for the reception base B2 in the direction of incidence $v_n$, $\delta r^{B1}_n$ is the error in the path difference for the reception base B1 in the direction of incidence $v_n$.

It is noted at this juncture that:

an error solely in the path difference of the reception base B2 (that is to say $\delta r^{B1}_k = 0$) corresponds to a rotation about the axis of the craft frame of vector x, an error solely in the path difference of the reception base B1 (that is to say $\delta r^{B2}_k = 0$) corresponds to a rotation about the axis of the craft frame of vector y.

Consequently, it is possible to express the directions of incidence $v_m$ and $v_n$ as being obtained, with the help of their estimations $ve_m$ and $ve_n$ respectively, by successive rotations about the axes of the craft frame of vectors x and y.

For the direction of incidence $v_k$ and its estimate $ve_k$, k equal to m or n, this amounts to having $v_k = M_k \cdot ve_k$, with:

$$M_k = \begin{pmatrix} 1 & 0 & 0 \\ 0 & 1 & -\varepsilon x_k \\ 0 & \varepsilon x_k & 1 \end{pmatrix} \cdot \begin{pmatrix} 1 & 0 & \varepsilon y_k \\ 0 & 1 & 0 \\ -\varepsilon y_k & 0 & 1 \end{pmatrix}$$

in which expression $\varepsilon x_k$ and $\varepsilon y_k$ (k equal to m or n) correspond to the angles of rotation about the axes of the craft frame of vectors x and y respectively, which angles of rotation are considered to be small so that $\cos(\varepsilon x_k)$ and $\cos(\varepsilon y_k)$ are substantially equal to $\varepsilon x_k$ and $\varepsilon y_k$ respectively, and so that $\sin(\varepsilon x_k)$ and $\sin(\varepsilon y_k)$ are substantially equal to 1.

It is also possible to neglect the second-order terms so as to obtain the following relation:

$$M_k \approx \begin{pmatrix} 1 & 0 & \varepsilon y_k \\ 0 & 1 & -\varepsilon x_k \\ -\varepsilon y_k & \varepsilon x_k & 1 \end{pmatrix}$$

By replacing, in the expression for the difference $\Delta Y_{mn}$, the directions of incidence $v_m$ and $v_n$ by respectively $M_m \cdot ve_m$ and $M_n \cdot ve_n$, a relation of the following type is obtained:

$$\Delta Y_{mn} = \begin{pmatrix} ve_{mx} \cdot ve_{ny} - ve_{my} \cdot ve_{nz} \\ -ve_{mz} \cdot ve_{nx} + ve_{mx} \cdot ve_{nz} \\ -ve_{mz} \cdot ve_{ny} + ve_{my} \cdot ve_{nz} \\ ve_{mz} \cdot ve_{nx} - ve_{mx} \cdot ve_{nz} \end{pmatrix}^T \cdot \begin{pmatrix} \varepsilon x_m \\ \varepsilon y_m \\ \varepsilon x_n \\ \varepsilon y_n \end{pmatrix} + O(\varepsilon) = a(ve_m, ve_n) \cdot \begin{pmatrix} \varepsilon x_m \\ \varepsilon y_m \\ \varepsilon x_n \\ \varepsilon y_n \end{pmatrix} + O(\varepsilon)$$

in which expression $o(\varepsilon)$ corresponds to the second-order terms. Neglecting these second-order terms, we obtain:

$$\Delta Y_{mn} \approx a(ve_m, ve_n) \cdot \begin{pmatrix} \varepsilon x_m \\ \varepsilon y_m \\ \varepsilon x_n \\ \varepsilon y_n \end{pmatrix}$$

For the reception base B2, if $\Delta re2_k$ denotes the estimate of the path difference $\Delta r2k$, we have:

$$\delta r^{B2}{}_k = \Delta re2_k - \Delta r2_k = b \cdot ve_k \cdot y - b \cdot v_k \cdot y$$

Because the error $\delta r^{B2}{}_k$ does not depend on the angle of rotation $\varepsilon y_k$, we can write:

$$\delta r_k^{B2} = \left( ve_k - \begin{pmatrix} 1 & 0 & 0 \\ 0 & 1 & -\varepsilon x_k \\ 0 & \varepsilon x_k & 1 \end{pmatrix} \cdot ve_k \right) \cdot b \cdot y = \begin{pmatrix} 0 & 0 & 0 \\ 0 & 0 & b \cdot \varepsilon x_k \\ 0 & -b \cdot \varepsilon x_k & 0 \end{pmatrix} \cdot ve_k \cdot y$$

Consequently, we obtain:

$$\delta r^{B2}{}_k = b \cdot \varepsilon x_k \cdot ve_{kz}.$$

In an analogous manner, the following expression is obtained for $\delta r^{B1}{}_k$:

$$\delta r^{B1}{}_k = -b \cdot \varepsilon y_k \cdot ve_{kz}.$$

In accordance with the expression hereinabove for the difference $\Delta Y_{mn}$, we have the following relation:

$$\Delta Y_{mn} = \frac{1}{b} \cdot \begin{pmatrix} ve_{mx} \cdot ve_{ny} - ve_{my} \cdot ve_{nz} \\ -ve_{mz} \cdot ve_{nx} + ve_{mx} \cdot ve_{nz} \\ -ve_{mz} \cdot ve_{ny} + ve_{my} \cdot ve_{nz} \\ ve_{mz} \cdot ve_{nx} - ve_{mx} \cdot ve_{nz} \end{pmatrix}^T \cdot \begin{pmatrix} \dfrac{\delta r_m^{B2}}{ve_{mz}} \\ -\dfrac{\delta r_m^{B1}}{ve_{mz}} \\ \dfrac{\delta r_n^{B2}}{ve_{nz}} \\ -\dfrac{\delta r_n^{B1}}{ve_{nz}} \end{pmatrix}$$

that is to say:

$$\Delta Y_{mn} = \frac{1}{b} \cdot \begin{pmatrix} \dfrac{ve_{mx} \cdot ve_{ny} - ve_{my} \cdot ve_{nz}}{ve_{mx}} \\ \dfrac{ve_{mx} \cdot ve_{nx} - ve_{mx} \cdot ve_{nz}}{ve_{mx}} \\ \dfrac{-ve_{mz} \cdot ve_{ny} + ve_{my} \cdot ve_{nz}}{ve_{nz}} \\ \dfrac{-ve_{mz} \cdot ve_{nz} + ve_{mx} \cdot ve_{nz}}{ve_{nz}} \end{pmatrix}^T \cdot \begin{pmatrix} \delta r_m^{B2} \\ \delta r_m^{B1} \\ \delta r_n^{B2} \\ \delta r_n^{B1} \end{pmatrix}$$

On the basis of the above relation, given by way of nonlimiting example, it is understood that any algorithm known to the person skilled in the art can be implemented to estimate the spatial errors with the help of the difference between on the one hand the theoretical inter-satellite angular distances and, on the other hand, the estimated inter-satellite angular distances.

The above relation links a scalar observation (difference $\Delta Y_{mn}$) with four parameters to be estimated (spatial errors $\delta r^{B2}{}_m$, $\delta r^{B1}{}_m$, $\delta r^{B2}{}_n$, $\delta r^{B1}{}_n$). It may for example be implemented in a recursive estimation algorithm (recursive least squares, Kalman filter, etc.). In this case, it is possible to execute step 55 of estimating the spatial errors pair of GPS satellites 20 by pair of GPS satellites (or to consider different groups of pairs of satellites at each iteration).

It should be noted that, in the course of time, GPS satellites 20 may enter or exit the radioelectric field of view of the craft 10. Thus, as and when GPS satellites 20 enter the radioelectric field of view of the craft 10, they can be considered among pairs for the calibration of the spatial errors for the directions of incidence of these GPS satellites 20.

Furthermore, the directions of incidence of one and the same pair of GPS satellites 20 situated in the radioelectric field of view of the craft 10 will vary in the course of time, on account of the transit of the craft 10 in LEO orbit. One and the same pair of GPS satellites 20 may therefore be considered several times in the course of time to estimate the spatial errors for different directions of incidence.

More generally, it is therefore understood that the calibration method 50 carries out advantageously, in particular modes of implementation, a temporal filtering to estimate the spatial errors as a function not only of the observations at a given instant, but also as a function of earlier observations. Such temporal filtering is inherent in recursive estimation algorithms especially. Several implementations are possible for taking into account such observations carried out at different instants, and it is understood that the choice of a particular implementation merely constitutes one variant of the invention among others. According to a nonlimiting example, the steps of the method 50 for calibrating spatial errors can be iterated each time that a new pair of GPS satellites 20 has been detected. Preferably, in this case, step 55 of estimating the spatial errors implements a Kalman filter.

It should be noted that nothing excludes the estimation of spatial errors for each direction of incidence of the GPS satellites 20 situated, over time and in tandem with the respective transits of said GPS satellites and of the spacecraft above the surface of the Earth, in the radioelectric field of view of the spacecraft 10.

In particular modes of implementation, the spatial errors are estimated in the form of a parametric model whose parameters are estimated as a function of theoretical inter-satellite angular distances and of estimated inter-satellite angular distances calculated for various pairs of GPS satellites 20.

In a preferred exemplary implementation, the spatial errors are, in the parametric model, piecewise constant. Stated otherwise, the radioelectric field of view of the spacecraft 10 is previously partitioned into a plurality of distinct cones of incidence of radioelectric signals with respect to the craft 10, and the spatial errors are considered to be the same for any direction of incidence inside one and the same incidence cone.

In this way, it is possible to estimate just one spatial error per reception base B1, B2 for each incidence cone, thereby making it possible to reduce the number of calculations to be performed and/or the quantity of spatial errors to be stored.

Figure 5:
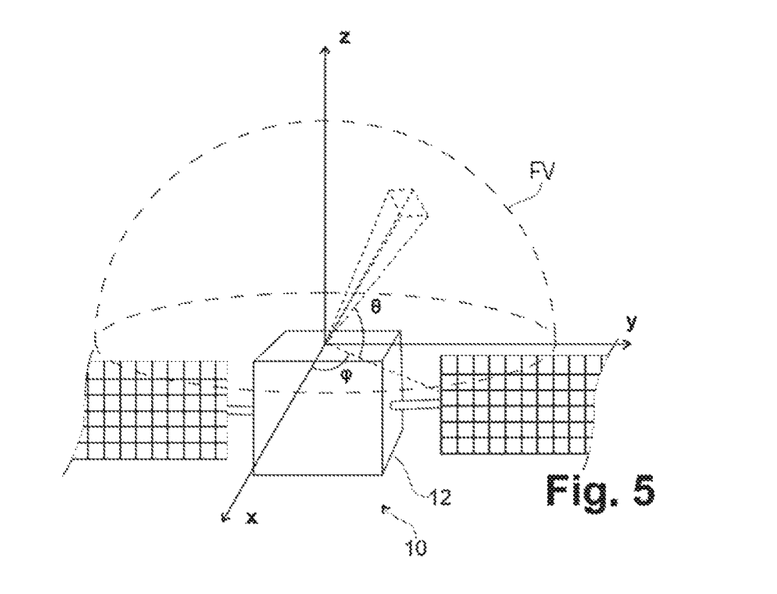
FIG. 5: a schematic representation of a radioelectric field of view of the spacecraft.

FIG. 5 schematically represents the radioelectric field of view (designated by "FV") of the spacecraft 10 as being substantially semi-hemispherical above a plane determined by the three reception antennas A1, A2, A3. FIG. 5 also represents the convention adopted in a nonlimiting manner to express a direction of incidence $v_m$ in the form of two angles of incidence:

an angle $\phi$ of azimuth, chosen as being the angle between the vector x and the projection of the direction of incidence $v_m$ on the plane determined by the three reception antennas A1, A2, A3, an angle $\theta$ of elevation, chosen as being the angle between the direction of incidence $v_m$ and the plane determined by said three reception antennas A1, A2, A3.

It is for example possible to define a set of adjacent incidence cones, each of said incidence cones corresponding to a width of 5 degrees in azimuth and 5 degrees in elevation.

In a particularly advantageous partition of the radioelectric field of view FV of the spacecraft 10, the cones of incidence of low elevation with respect to a plane determined by the three reception antennas A1, A2, A3 of the spacecraft 10 are of smaller respective solid angles than those of cones of incidence of high elevation with respect to said plane.

It has indeed been noted that the indirect component is weaker for substantially normal directions of incidence (high elevation), with respect to the plane determined by the three reception antennas, than for the grazing directions of incidence (low elevation) with respect to said plane.

Such provisions make it possible to have a smaller spatial sampling interval in the zones where the spatial errors vary a lot than in the zones where said spatial errors vary little.

Figure 6:
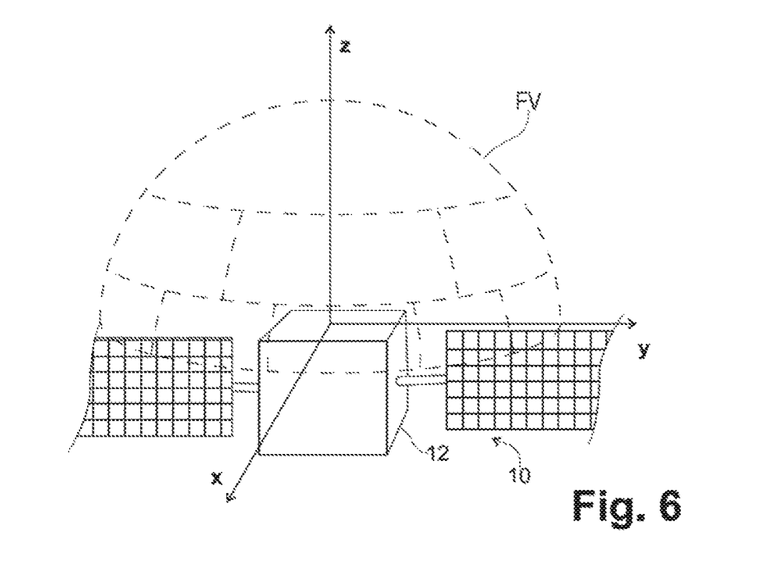
FIG. 6: a schematic representation of a particular partition of the radioelectric field of view of the spacecraft.

FIG. 6 schematically represents an example of such a radioelectric field of view FV, in which the smaller the elevation 8, the smaller the width of the incidence cones, both in azimuth and in elevation.

It should be noted that nothing excludes, according to other examples, consideration of other types of parametric models suitable for modeling the spatial errors with the help of a finite number of parameters. According to a nonlimiting example, the spatial errors are estimated in the form of a parametric model whose basis functions are spherical harmonics.

The method 50 for calibrating spatial errors is advantageously used in a method of estimating attitude of the spacecraft 10. For example, the spatial errors are calibrated in the form of errors in a path difference of the radioelectric signals for each reception base B1, B2. The estimation of attitude is performed for example by estimating path differences as a function of phase measurements on each of the reception antennas A1, A2, A3. Thereafter, the spatial errors are compensated on said estimated path differences, and the attitude of the spacecraft 10 is estimated as a function of the path differences obtained after compensation according to any attitude estimation algorithm known to the person skilled in the art, for example by means of a Kalman filter.

The present invention also relates to a system for estimating attitude of the spacecraft 10 as a function of phase measurements of radioelectric signals received on the three reception antennas A1, A2, A3.

The attitude estimation system comprises, especially, in addition to conventional means, means configured to calibrate the spatial errors in accordance with the invention. As shown in FIG. 2, these means take for example the form of a processing unit 13 comprising at least one processor 14 and an electronic memory 15 in which a computer program product is stored, in the form of a set of program code instructions to be executed by the processor so as to calibrate the spatial errors and to estimate the attitude of the craft 10. In a variant, the processing unit of the attitude estimation system comprises programmable logic circuits, of FPGA, PLD type, etc., and/or specific integrated circuits (ASICs), configured to perform all or part of the calibration of the spatial errors.

It should be noted that the attitude estimation system is either distributed between the spacecraft 10 and a ground station, or embedded entirely onboard said spacecraft 10.

It was considered hereinabove that the Ns satellites were satellites of a global satellite navigation system. Nothing excludes, according to other examples, consideration of other types of satellites. In such a case, the respective positions of the Ns satellites and of the craft can be obtained by any means known to the person skilled in the art. For example, said positions can be estimated by a ground station and sent to the craft for estimation of the theoretical inter-satellite angular distances.

Furthermore, a spacecraft 10 was considered hereinabove. Nothing excludes, according to other examples, consideration of an aerial craft or of any object for which an estimation of orientation could be advantageous.

Moreover, the invention has been described by considering radioelectric signals transmitted by satellites. According to other examples, nothing excludes consideration of aerial or terrestrial transmitters, in addition to said satellites or instead of said satellites. For example, it is possible to consider radioelectric signals transmitted by terrestrial pseudolites.

The description hereinabove clearly illustrates that through its various characteristics and their advantages, the present invention achieves the objectives that it set out to attain. In particular, the present invention makes it possible to calibrate, without requiring an attitude tracker other than the reception antennas, the spatial errors induced by phase biases affecting phase measurements of radioelectric signals received by said reception antennas.

The invention claimed is:

1. A method for of estimating attitude of a craft as a function of measurements of phase differences of radioelectric signals received by at least three non-aligned reception antennas of the craft, comprising steps of:

calibrating spatial errors induced by phase biases affecting measurements of the phase differences of the radioelectric signals received by said at least three non-aligned reception antennas of the craft, said phase biases depending on a direction of incidence of the radio-electric signals with respect to the craft, comprising steps of:

obtaining respective positions of the craft and a pair of satellites situated at a given instant in a radio-electric field of view of the craft;

calculating by at least one processor, an inter-satellite angular distance of said pair of satellites as a function of the respective positions of the craft and said pair of satellites to obtain a theoretical inter-satellite angular distance;

calculating by said at least one processor, respective directions of incidence of said pair of satellites with respect to the craft as a function of phase measurements of radio-electric signals received from said pair of satellites by the three non-aligned reception antennas of the craft;

calculating by said at least one processor, the inter-satellite angular distance of said pair of satellites as a function of the respective directions of incidence of said pair of satellites with respect to the craft to obtain an estimated inter-satellite angular distance; and calculating by said at least one processor, the spatial errors for the respective directions of incidence of the said pair of satellites with respect to the craft as a function of the theoretical inter-satellite angular distance and of the estimated inter-satellite angular distance determined for said pair of satellites; and compensating the spatial errors calculated during a calculation of the attitude of the craft.

2. The method as claimed in claim 1, further comprising the step of calculating the spatial errors in a form of a parametric model whose parameters are estimated as a function of theoretical inter-satellite angular distances and of estimated inter-satellite angular distances determined for pairs of satellites.

3. The method as claimed in claim 2, further comprising the step of pre-partitioning the radio-electric field of view of the craft into a plurality of distinct cones of incidence of radio-electric signals with respect to the craft; and wherein the spatial errors are considered to be the same for any direction of incidence inside same incidence cone.

4. The method as claimed in claim 3, wherein the cones of incidence of low elevation with respect to a plane determined by phase centers of the three non-aligned reception antennas of the craft are of smaller respective solid angles than those of cones of incidence of high elevation with respect to said plane.

5. The method as claimed in claim 2, further comprising the step of calculating the spatial errors in a form of a parametric model whose basis functions are spherical harmonics.

6. The method as claimed in claim 1, wherein the satellites belong to a global satellite navigation system and the three non-aligned reception antennas are antennas of receivers of said global satellite navigation system; and further comprising the step of determining the respective positions of the satellites and of the craft in accordance with navigation information included in the radio-electric signals received from said satellites.

7. The method as claimed in claim 1, further comprising the step of calculating the spatial errors in a recursive manner, a pair of satellites by a pair of satellites or a group of pairs of satellites by a group of pairs of satellites.

8. The method as claimed in claim 1, wherein Ns satellites organized into Np pairs being situated simultaneously in a radio-electric field of view of the craft; and further comprising the step of calculating the spatial errors for each of the respective directions of incidence of the Ns satellites with respect to the craft simultaneously as a function of the theoretical inter-satellite angular distances and of the estimated inter-satellite angular distances determined for said Np pairs of satellites.

9. The method as claimed in claim 1, further comprising the step of utilizing at least one of: new pairs of satellites entering the radio-electric field of view of the craft in a course of time or a same pair of satellites several times in the course of time.

10. A non-transitory computer readable medium comprising a set of program code instructions, when executed by said at least one processor, implement the steps of calculating attitude of the craft in accordance with the method as claimed in claim 1.

11. A system to calculate an attitude of a craft as a function of measurements of phase differences of radio-electric signals, comprising:

at least three non-aligned reception antennas on the craft for receiving the radio-electric signals;

a processing unit comprising at least one processor configured to:

obtain respective positions of the craft and a pair of satellites situated at a given instant in a radio-electric field of view of the craft, and calculate an inter-satellite angular distance of said pair of satellites as a function of the respective positions of the craft and said pair of satellites to obtain a theoretical inter-satellite angular distance;

calculate respective directions of incidence of said pair of satellites with respect to the craft as a function of phase measurements of radio-electric signals received from said pair of satellites by the three non-aligned reception antennas of the craft, and calculate the inter-satellite angular distance of said pair of satellites as a function of the respective directions of incidence of said pair of satellites with respect to the craft to obtain a calculated inter-satellite angular distance;

calculate the spatial errors for the respective directions of incidence of the said pair of satellites with respect to the craft as a function of the theoretical inter-satellite angular distance and of the calculated inter-satellite angular distance determined for said pair of satellites; and compensate the spatial errors calculated during a calculation of the attitude of the craft.

12. The attitude estimation system as claimed in claim 11, wherein the three non-aligned reception antennas are antennas of receivers of a global satellite navigation system.

13. A spacecraft comprising an attitude estimation system as claimed in claim 11.

14. The spacecraft as claimed in claim 13, further comprising a body comprising a plurality of substantially plane external faces; and wherein the three non-aligned reception antennas are arranged on same external face of said body.

* * * * *